United States Patent Office 3,502,738
Patented Mar. 24, 1970

3,502,738
PREPARATION OF 1,4-HEXADIENE FROM ETHYLENE AND BUTADIENE WITH SELECTED HYDROCARBON-RHODIUM CATALYSTS
Richard D. Cramer, Landenberg, Pa., assignor to E. I. du Pont de Nemours and Company, Wilmington, Del., a corporation of Delaware
No Drawing. Filed Oct. 27, 1966, Ser. No. 589,794
Int. Cl. C07c *3/52, 3/60*
U.S. Cl. 260—680   4 Claims

ABSTRACT OF THE DISCLOSURE

Described is the process for producing 1,4-hexadiene from ethylene and butadiene with selected hydrocarbon-rhodium catalysts, e.g., $\mu$-dichlorotetraethylenedirhodium-(I), 2,4-pentanedionatodiethylenerhodium(I) or $$(\pi\text{-}C_4H_7)_2Rh_2Cl_4C_4H_6$$

FIELD OF THE INVENTION

This invention relates to, and has as its principal object provision of, a new catalytic process for making 1,4-hexadiene, particularly valuable as a component of ethylene/propylene/1,4-hexadiene terpolymers which are curable to useful elastomeric products (see Gresham and Hunt, U.S. Patent 2,933,480).

DESCRIPTION OF THE INVENTION

The new process consists in reacting ethylene and butadiene in the presence of a catalytic amount of a complex rhodium compound of one of the formulas (1) $(A_2RhX)_2$
(2) $A_2RhCh$
(3) $M_2(QRhX_3L)_2$ and (4) $(\pi\text{-}DH)_2Rh_2X_4D$ wherein:

Rh is rhodium;
A represents a molecule of ethylene, propylene, vinyl fluoride, vinyl chloride, a vinyl lower alkanoate, allyl alcohol, an allyl lower alkanoate, a vinyl lower alkyl ether, styrene, acrylic acid, a lower alkyl acrylate, or acrylonitrile, said molecule being coordinated to rhodium through its carbon-carbon double bond, and where $A_2$ can represent one molecule of 1,5-hexadiene or 1,5-cyclooctadiene, coordinated to rhodium through both double bonds;
X is chlorine or bromine;
Ch represents a $\beta$-diketonato group, bonded by chelation to rhodium, of the formula RCOCHCOR′, where R and R′ are the same or different and are lower alkyl or phenyl;
M is hydrogen, ammonium, or an alkali metal;
Q is ethyl or propyl;
L is a molecule of water or a lower alkanol, coordinated to rhodium;
D represents a molecule of 1,3-butadiene, 2-methyl-1,3-butadiene (isoprene), 2-chloro-1,3-butadiene (chloroprene), or 1,3-pentadiene (piperylene), each double bond of which is coordinated to a different rhodium atom in compound (4); and
$\pi$-DH represents a group derived from a molecule D by addition of a hydrogen atom, each of which groups is $\pi$-bonded to a different rhodium atom, e.g., a $\pi$-crotyl group derived from 1,3-butadiene.

Examples of vinyl lower alkanoates (symbol A) are vinyl acetate, vinyl isobutyrate, vinyl trimethylacetate, and vinyl hexanoate. Examples of allyl lower alkanoates are allyl acetate, allyl propionate, and allyl isovalerate. Examples of vinyl lower alkyl ethers are vinyl ethyl ether, vinyl isopropyl ether, vinyl tert-butyl ether, and vinyl isohexyl ether. Examples of lower alkyl acrylates are ethyl acrylate, isopropyl acrylate, and tert-butyl acrylate.

The concept of "$\pi$-crotyl" groups (Formula 4), the way in which such groups can be bonded to certain transition metals, and the relation between such groups and the corresponding 1,3-dienes containing one less hydrogen atom are well-known to those skilled in the art and are described by Green and Nagy in "Advances in Organometallic Chemistry," vol. 2, edited by Stone and West, Academic Press, New York, 1964, pp. 325–360, especially pp. 330–356.

Of the four types of catalysts listed above, those of Formulas 1, 2, and 4 are preferred because of relative ease of preparation, the compounds of Formula 1 being especially preferred. In catalysts of Formulas 1 and 2, the preferred ethylenically unsaturated compounds, i.e., values of A, are ethylene, propylene, vinyl chloride, and vinyl fluoride, because of a combination of stability of the products and availability of the unsaturated compounds. Ethylene is an especially preferred value of A. 2,4-pentanedionato is the preferred value of Ch in compounds of Formula 2 because of the availability of 2,4-pentanedione, the diketone from which it is derived. The preferred cations in compounds of Formula 3 are hydrogen (compound available only in solution) and cesium, and the preferred value of L is $H_2O$ because of ease of preparation.

Descriptions and Syntheses of the Catalyst Compounds

The synthesis and structure of $\mu$-dichlorotetraethylene-dirhodium(I), the compound of Formula 1 in which A is ethylene, are given by Cramer, Inorg. Chem. 1, 722 (1962). As stated therein, [(propylene)$_2$RhCl]$_2$ is prepared in the same manner by substituting propylene for ethylene. It can also be prepared by displacing ethylene from the ethylene complex with excess propylene. The preparation of the compound of Formula 1 in which $A_2$ represents a molecule of 1,5-hexadiene is described by Cramer, J. Am. Chem. Soc. 86, 221 (1964). The compound of this group in which $A_2$ is 1,5-cyclooctadiene is described by Chatt and Venanzi, Nature 177, 852 (1956); see also J. Chem. Soc. 1957, 4735.

Other compounds of Formula 1 are prepared by displacing ethylene in [(ethylene)$_2$RhCl]$_2$ with the appropriate ethylenically unsaturated compound. The following preparation of the vinyl chloride complex is typical:

Preparation of [$(C_2H_3Cl)_2RhCl$]$_2$

A mixture of 1 g. of [$(C_2H_4)_2RhCl$]$_2$ and about 10 ml. (9.2 g.) of liquid vinyl chloride was stirred at —25° C. The solid slowly changed from reddish-brown to yellow. After 15 minutes, the mixture was warmed slowly to evaporate the liquid and recooled to about —25° C., and about 10 ml. of fresh vinyl chloride was condensed on the residue. The process of stirring and evaporation was essentially repeated, to give $\mu$-dichlorotetrakis(vinyl chloride)dirhodium(I) as a yellow crystalline solid that darkened but did not melt below 220° C.

*Analysis.*—Calc'd for $C_4H_6Cl_3Rh$ (percent): C, 18.24; H, 2.30; Cl, 40.39. Found (percent): C, 18.08; H, 2.83; Cl, 36.69.

The preparation of products of this class in which the compound A is a liquid at ordinary temperatures can be carried out at 25° C. (See preparation of the corresponding compounds of Formula 2, below.)

Compounds of Formula 1 in which X is bromine can be made in the same manner by starting with hydrated rhodium tribromide in place of rhodium chloride.

The synthesis and structure of 2,4-pentanedionato-diethylenerhodium(I), a typical compound of Formula 2, is described by Cramer, J. Am. Chem. Soc. 86, 221 (1964). (See also Cramer and Parshall, J. Am. Chem. Soc. 87, 1392 (1965), particularly for the structure and mode of bonding of the Ch group.) Ethylene complexes of this type containing other chelated β-diketonato groups can be prepared by the same method, the appropriate β-diketone, $RCOCH_2COR'$, being substituted for 2,4-pentanedione.

Compounds of Formula 2 containing A molecules other than ethylene are prepared by displacing ethylene from the appropriate ethylene complex with the desired ethylenically unsaturated compound. The following preparations are typical:

Preparation of $(C_2H_3Cl)_2RhC_5H_7O_2$

In an atmosphere of nitrogen, 0.5 g. of $(C_2H_4)_2RhC_5H_7O_2$

[2,4-pentanedionatodiethylenerhodium(I)] was cooled to about −25° C., and about 10 ml. (9.2 g.) of liquid vinyl chloride was added. The mixture was stirred for about 15 minutes, during which time much of the solid dissolved. Unreacted vinyl chloride was evaporated by gentle warming, the residue was recooled to about −25° C., about 10 ml. of fresh vinyl chloride was added, and the mixture was stirred for about 15 minutes. Evaporation of vinyl chloride left a yellow liquid, which crystallized when washed with isobutane at −50° C. The product was 2,4-pentanedionatobis(vinyl chloride)rhodium(I), M.P. 42–43° C.

Analysis.—Calc'd for $C_9H_{13}Cl_2O_3Rh$ (percent): C, 33.06; H, 4.01; Cl, 21.69. Found (percent): C, 32.38; H, 4.21; Cl, 21.11.

Preparation of $(C_3H_6)_2RhC_5H_7O_2$

A mixture of 0.5 g. of $(C_2H_4)_2RhC_5H_7O_2$, about 10 ml. (6.1 g.) of propylene, and 20 ml. of methyl chloride was stirred for 10 minutes at −40° C. in a nitrogen atmosphere. The liquid was evaporated at about −20° C. The treatment with propylene and methyl chloride, followed by evaporation, was repeated twice. The residual product, which was 2,4 - pentanedionatodipropylenerhodium(I), was a light brown crystalline solid that melted at 40° C.

Analysis.—Calc'd for $C_{11}H_{19}O_2Rh$ (percent): C, 46.16; H, 6.69. Found (percent): C, 45.11; H, 6.56.

The products of the preceding two experiments, together with others in which the coordinated A compounds are gases at ordinary temperatures, can also be made from the appropriate ethylene complex by treating the latter repeatedly with the desired A compound in tetrahydrofuran solution at 25° C. and slightly below atmospheric pressure. The first two compounds in the table below were prepared by this procedure.

Compounds of Formula 2 in which the A compound is a liquid at ordinary temperatures are conveniently prepared by dissolving the appropriate ethylene complex in an excess of the ethylenically unsaturated compound at 25° C. Ethylene begins to be evolved immediately. When evolution is complete (usually about 30 minutes), the mixture is concentrated under vacuum and the solid residue is worked up by conventional procedures such as recrystallization. The last seven compounds of the table below were prepared by this procedure.

The following table lists additional characterizations of compounds of Formula 2, synthesized as noted in the two immediately preceding paragraphs.

TABLE

| Compound | M.P., °C. | Analysis Calculated | Found |
|---|---|---|---|
| (Vinyl fluoride)$_2$RhC$_5$H$_7$O$_2$ | 57–58 | C, 36.76; H, 4.45; F, 12.92 | C, 37.15; H, 4.49; F, 12.90 |
| (Methyl vinyl ether)$_2$RhC$_5$H$_7$O$_2$ | 121–121.5 | C, 41.52; H, 6.02 | C, 41.65; H, 6.02 |
| (Vinyl acetate)$_2$RhC$_5$H$_7$O$_2$ | 120–121 | C, 41.72; H, 5.12 | C, 41.71; H, 5.13 |
| (Allyl acetate)$_2$RhC$_5$H$_7$O$_2$ | 25 | C, 44.79; H, 5.76 | C, 44.60; H, 5.81 |
| (Styrene)$_2$ RhC$_5$H$_7$O$_2$ | 92–92.5 | C, 61.47; H, 5.65 | C, 61.23; H, 5.82 |
| (Methyl acrylate)$_2$RhC$_5$H$_7$O$_2$ | 75–75.5 | C, 41.72; H, 5.12 | C, 42.06; H, 5.27 |
| (Acrylic acid)$_2$RhC$_5$H$_7$O$_2$ | [1] 100–200 | C, 38.17; H, 4.37 | C, 38.08; H, 4.41 |
| (Acrylonitrile)$_2$RhC$_5$H$_7$O$_2$ | Dec. | C, 42.88; H, 4.25; N, 9.09 | C, 45.06; H, 4.43; N, 10.08 |
| (Allyl alcohol)$_2$RhC$_5$H$_7$O$_2$ |   | C, 41.52; H, 6.02 | C, 42.62; H, 6.16 |

[1] Dec.

Compounds containing other chelated Ch groups can be made by starting with the appropriate β-diketone in place of 2,4-pentanedione.

The compound $Cs_2[C_2H_5RhCl_3(H_2O)]_2$, a representative compound of Formula 3, is prepared from μ-dichlorotetraethylenedirhodium(I) as described by the present petitioner's publication Cramer, J. Am. Chem. Soc. 87, 4727 (1965) as follows:

Preparation of $Cs_2[C_2H_5RhCl_3(H_2O)]_2$

A reactor containing 20 ml. of methanolic 1M HCl was cooled in liquid nitrogen, and 1 g. of μ-dichlorotetraethylenedirhodium(I) was added. The reactor was connected to a liquid-nitrogen trap, the system was evacuated, and the reaction mixture was warmed to −24° C. and held between this tempearture and −18° C. for 3 hours. During this time ethylene distilled from the reaction mixture into the trap. After 3 hours reaction was complete, as indicated by (a) complete dissolution of the rhodium compound and (b) constant pressure over the reaction mixture. A solution of 1 g. of cesium chloride in 75 ml. of methanolic 0.4M HCl was added. A solid precipitated. It was separated by filtration, washed with methanol and with ether before exposure to air, and dried, to give 1.6 g. of $Cs_2[C_2H_5RhCl_3(H_2O)]_2$ as a rose-colored crystalline solid.

Analysis.—Calcd. for $C_2H_7Cl_3CsORh$ (percent): C, 6.17; H, 1.82; Cl, 27.33; Cs, 34.14; Rh, 26.43. Found (percent): C, 6.01; H, 0.74; Cl, 28.06; Cs, 35.3; Rh, 24.72. The corresponding propyl derivative can be prepared by the same method from μ-dichlorotetrapropylenedirhodium(I).

In the process above for producing compounds of Formula 3, the molecule of water coordinated to the rhodium is believed to come from adventitious amounts of water in the methanolic HCl, water coordinating to rhodium in preference to methanol or other lower alkanols when both are present. Compounds of Formula 3 in which L is a lower alkanol can be made by the foregoing procedure by using freshly prepared alkanolic HCl and rigorously excluding moisture from the reaction system.

Compounds of Formula 3 containing cations other than cesium can be prepared by a number of conventional methods. Compounds in which M is rubidium or, in some instances, potassium, can be prepared by substituting rubidium fluoride or chloride or potassium fluoride or chloride for cesium chloride in a precipitation step such as that described in the foregoing experiment.

When the desired compound cannot be isolated by a difference in solubility, it can be prepared through the use of a cation-exchange resin by techniques well known to one skilled in th art. For example, a cation-exchange resin of the cross-linked poly(styrenesulfonic acid) type in which the cation is the desired value of M can be used. If a resin containing the desired cation is not available commercially, it can easily be prepared by passing a solution of a salt containing the desired cation through a column packed with the acid form of the resin (i.e., the form of the resin in which the cation is hydrogen) until the effluent liquid is no longer acidic.

Whatever the source of the resin containing the desired cation M, the compound of Formula 3 containing this cation is prepared by passing a dilute solution of a compound of Formula 3 containing another cation through a column packed with the particular cation-exchange resin. For example, $Na_2[C_2H_5RhCl_3(H_2O)]_2$ or $$(NH_4)_2[C_2H_5RhCl_3(H_2O)]_2$$

can be prepared by passing a dilute solution of the cesium salt of the foregoing experiment through a column packed with a cation-exchange resin in which the cation is sodium or ammonium. The desired salt is isolated by evaporating the effluent liquid. If the acid form of the resin is used directly, the hydrogen-containing product is obtained, e.g., $H_2[C_2H_5RhCl_3(H_2O)]_2$ from $Cs[C_2H_5RhCl_3(H_2O)]_2$, but generally cannot be completely separated from the solution in which is it prepared.

Compounds of Formula 3 in which X is bromine can be prepared by using the corresponding bromo-olefin-rhodium complexes and HBr in place of the chloro complexes and HCl.

The compound of Formula 4 in which D is 1,3-butadiene and π-DH is π-crotyl is prepared from rhodium chloride and butadiene as described by Powell and Shaw, Chem. Comm. 1966, 323. Alternatively, it can be prepared from μ-dichlorotetraethylenedirhodium(I) and 1,3-butadiene, as follows:

Preparation of $(\pi\text{-}C_4H_7)_2RH_2Cl_4C_4H_6$ 1,3-butadiene was bubbled through a stirred solution of 14.6 g. of μ-dichlorotetraethylenedirhodium(I) in 300 ml. of 0.8M methanolic HCl at 25° C. for 2 hours. The solid that precipitated was separated by filtration, washed with methanol, and dried, to give 13.3 g. of $$(\pi\text{-}C_4H_7)_2RH_2Cl_4Cl_2H_6$$

as a yellowish-brown crystalline solid. The product decomposes without melting when heated above 100° C. It can be recrystallized from chloroform.

*Analysis.*—Calcd. for $C_{12}H_{20}Cl_4Rh_2$ (percent): C, 28.16; H, 3.91; Cl, 27.71; M.W., 512. Found (percent): C, 28.41; H, 4.16; Cl, 27.90; M.W., 458, 472 (cryoscopic in benzene).

THE PROCESS OF THE INVENTION

The process of the invention is carried out by simultaneously contacting ethylene and butadiene in the liquid phase with one of the above-mentioned catalysts either batch-wise or continuously, the reactants being supplied separately or as a mixture. The mole ratio of the ethylene and butadiene employed is, in any case, not critical. It can be from about 10 to about 0.1, and usually it is between about 2 and 0.5. Preferably an approximately equimolar mixture of the two reactants is used.

The ratio of moles of rhodium compound to total moles of ethylene and butadiene will usually be from about 0.0001 to 0.1, although even a lower amount of rhodium compound can be used as long as it provides catalytic activity. There is no particular advantage in going above a ratio of about 0.1, although the process is still operable.

Use of a solvent is not critical but it is preferred to use one. Operable solvents include water, various types of polar organic solvents, and mixtures thereof. Examples of operable organic solvents are lower alkanols such as methyl alcohol, ethyl alcohol, isopropyl alcohol, isobutyl alcohol and tert-pentyl alcohol; ethers such as tetrahydrofuran, 1,2-dimethoxyethane, di(2-ethoxyethyl)ether, ethyl ether, and butyl ether; lower alkanoic acids and their lower alkyl esters such as acetic acid, propionic acid, isovaleric acid, ethyl acetate, methyl isobutyrate, isopropyl butyrate and butyl propionate; and lower alkanenitriles such as acetonitrile, propionitrile and isobutyronitrile.

The process is carried out in the presence of a hydrohalic acid, which can be HCl, HBr, or HI. Such acid should be present in amount enough to furnish a total of at least two equivalents, and preferably three equivalents, of halide ion per atom of rhodium. The combined chlorine present in compounds such as $[(C_2H_4)_2RhCl]_2$ or $Cs_2[C_2H_5RhCl_3(H_2O)]_2$, but not in a compound such as (vinyl chloride)$_2RhC_5H_7O_2$, is included in determining these equivalents of halide ion. The hydrogen ion concentration in the reaction mixture should be at least about 0.001M. An upper limit is imposed only by the concentration of hydrohalic acid that is available, but the preferred range is about 0.1M to 2.0M.

Pressure is not critical, and atmospheric, subatmospheric, or superatmospheric pressures can be used. A convenient method of operation, which has the advantage that special pressure-resistant equipment is not required, is to supply ethylene and butadiene to the catalyst system at pressures of about 0.5–2.0 atm. and conduct the process in this pressure range. Another convenient method of operation is to charge the reactants and catalyst to a reactor at ordinary temperatures or lower and at atmospheric pressure or slightly above, close the reactor, heat to the desired temperature, and operate at the autogenous pressure of the system. However, the process is operable at much higher pressures than those reached in the systems just described, e.g., 1000 atmospheres or even higher.

The reaction proceeds at temperatures as low as 10° C., and the temperature can be as high as 250–300° C. Usually, to insure a practical rate of reaction, a temperature of at least 30° C. is used, and the preferred range is 30–100° C.

The desired product of the process, 1,4-hexadiene, can be separated from the other products by conventional methods, such as distillation or preparative-scale gas chromatography.

The following examples illustrate the process of the invention.

EXAMPLE 1

A glass reactor was purged with nitrogen and charged with 100 ml. of ethyl alcohol, 0.25 ml. of 12M hydrochloric acid, and 0.4 g. of μ-dichlorotetraethylenedirhodium(I). With stirring, the mixture was cooled in liquid nitrogen, evacuated, and heated to 70° C. An equimolar gaseous mixture of ethylene and butadiene was admitted continuously at a pressure of one atmosphere. After 6.5 hours, the solvent and reaction products were distilled from the reactor at 20–30° C./40–50 mm., and the mixture was analyzed by gas chromatography. Both cis- and trans-1,4-hexadiene were identified in the product by comparison of their detection times with those of authentic samples.

1,4-hexadiene can be similarly prepared from ethylene and butadiene by substituting the following compounds of Formula 1: dibromotetraethylenedirhodium(I), dichlorotetrapropylenedirhodium(I), dichlorotetrakis(vinyl chloride)dirhodium(I), dichlorobis(1,5-cyclooctadiene)dirhodium(I), dichlorotetrakis(vinyl acetate)dirhodium(I), dichlorotetrakis(allyl alcohol)dirhodium(I), or dichlorotetrakis(methyl acrylate)dirhodium(I); or the following compounds of Formula 3:

$Cs_2[C_2H_5RhCl_3(H_2O)]_2$, $Cs[C_2H_5RhCl_3(CH_3OH)]_2$
$Na_2[C_3H_7RhCl_3(H_2O)]_2$, or $(NH_4)_2[C_2H_5RhBr_3(H_2O)]_2$ in place of dichlorotetraethylenedirhodium(I) in the foregoing example.

EXAMPLE 2

A glass reactor was purged with nitrogen and charged with 30 ml. of ethanolic 1M HCl and 0.1 g. of 2,4-pentanedionatodiethylenerhodium(I), cooled to −80° C., and evacuated. Gaseous butadiene (300 ml.) and gaseous ethylene (170 ml.) were charged, and the mixture was stirred at 30° C. for 6 hours. During this time the pressure dropped from 1024 mm. to 783 mm. The solvent and the products were distilled from the mixture as in Example 1. The presence of both cis- and trans-1,4-hexadiene in the products was shown by gas chromatography.

Ethylene and butadiene can also be reacted to form 1,4-hexadiene by substituting 1-phenyl-1,3-butanedionatodiethylenerhodium(I),
2,4-pentanedionatobis(methyl vinyl ether)rhodium(I),
1,3-diphenyl-1,3-propanedionatodiethylenerhodium(I),
2,4-pentanedionatobis(allyl alcohol)rhodium(I),
2,4-nonanedionatodiethylenerhodium(I),
2,4-pentanedionatodistyrenerhodium(I),
3,5-hexanedionatodiethylenerhodium(I),
2,4-pentanedionatobis(acrylonitrile)rhodium(I),
2,6-dimethyl-3,5-hexanedionatodiethylenerhodium(I), or
2,4-pentanedionatobis(acrylic acid)rhodium(I)

for 2,4-pentanedionatodiethylenerhodium(I) in the procedure of Example 2.

EXAMPLE 3

A glass reactor was purged with nitrogen and charged with 0.5 g. of $(\pi\text{-}C_4H_7)_2Rh_2Cl_4C_4H_6$, 10 ml. of deaerated methanol, and 5 ml. of methanolic 3.2M HCl. The system was cooled in liquid nitrogen, evacuated, and opened for 90 minutes to a gas buret containing ethylene at slightly above atmospheric pressure. During this time 19 ml. of ethylene was absorbed. The system was then opened to a gas buret containing butadiene at one atmosphere; 72 ml. of butadiene was absorbed over a period of 125 minutes. The sequential introduction of ethylene and butadiene as described above was repeated four times. Ethylene and butadiene reacted to form higher boiling products, as shown by the pressure drop. The products included 1,4-hexadiene.

Since obvious modifications and equivalents in the invention will be evident to those skilled in the chemical arts, I propose to be bound solely by the appended claims.

The embodiments of the invention in which an exclusive property or privilege is claimed are defined as follows:

1. The process of preparing 1,4-hexadiene which comprises reacting together, at a temperature in the range 10–300° C., ethylene and butadiene in the presence of a hydrohalic acid and a catalytic amount of a preformed rhodium catalyst of the group consisting of:

(1) $(A_2RhX)_2$
(2) $A_2RhCh$
(3) $M_2(QRhX_3L)_2$ and (4) $(\pi\text{-}DH)_2Rh_2X_4D$ wherein:

Rh is rhodium;
the A's, singly, are molecules of ethylene, propylene, vinyl fluoride, vinyl chloride, a vinyl lower alkanoate, allyl alcohol, an allyl lower alkanoate, a vinyl lower alkyl ether, styrene, acrylic acid, a lower alkyl acrylate, or acrylonitrile, said molecule being coordinated to rhodium through its carbon-carbon double bond, or, jointly, are one molecule of 1,5-hexadiene or 1,5-cyclooctadiene, coordinated to rhodium through both double bonds;
X is chlorine or bromine;
Ch is a β-diketonato group, bonded by chelation to rhodium, of the formula RCOCHCOR′, where R and R′ are the same or different and are lower alkyl or phenyl;
M is hydrogen, ammonium, or an alkali metal;
Q is ethyl or propyl;
L is a molecule of water or a lower alkanol, coordinated to rhodium;
D is a molecule of 1,3-butadiene, 2-methyl-1,3-butadiene, 2-chloro-1,3-butadiene, or 1,3-pentadiene, each double bond of which is coordinated to a different rhodium atom; and
π-DH is a group derived from a molecule D as defined above by addition of a hydrogen atom, each of which groups is π-bonded to a different rhodium atom 2. The process of claim 1 wherein the catalyst is μ-dichlorotetraethylenedirhodium(I).

3. The process of claim 1 wherein the catalyst is 2,4-pentanedionatodiethylenerhodium(I).

4. The process of claim 1 wherein the catalyst is $(\pi\text{-}C_4H_7)_2Rh_2Cl_4C_4H_6$.

References Cited

UNITED STATES PATENTS 3,013,066  12/1961  Alderson _____ 260—683.15 X
3,379,706   4/1968  Wilke _____ 260—683.15 X PAUL M. COUGHLAN, Jr., Primary Examiner U.S. Cl. X.R.

260—429